(12) United States Patent
Simpson et al.

(10) Patent No.: US 8,105,511 B2
(45) Date of Patent: Jan. 31, 2012

(54) METHOD OF MANUFACTURING A CARBON-CARBON BRAKE DISC

(75) Inventors: Allen H. Simpson, Buchanan, MI (US); Mark L. La Forest, Granger, IN (US); Slawomir T. Fryska, Granger, IN (US); Barry P. Soos, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 228 days.

(21) Appl. No.: 12/213,235

(22) Filed: Jun. 17, 2008

(65) Prior Publication Data

US 2008/0251959 A1 Oct. 16, 2008

Related U.S. Application Data

(62) Division of application No. 10/942,258, filed on Sep. 16, 2004, now abandoned.

(51) Int. Cl.
*C01B 31/00* (2006.01)
(52) U.S. Cl. ........................................................ 264/29.1
(58) Field of Classification Search ................. 264/29.1
See application file for complete search history.

(56) References Cited

U.S. PATENT DOCUMENTS

| | | | |
|---|---|---|---|
| 773,710 A | 11/1904 | Bronson | |
| 2,379,568 A | 7/1945 | Herman | |
| 2,427,770 A | 9/1947 | Herman | |
| 3,409,971 A | 11/1968 | Morrow | |
| 3,565,374 A | 2/1971 | Jones | |
| 3,708,834 A | 1/1973 | Anderson | |
| 3,815,855 A | 6/1974 | Appleton | |
| 4,006,874 A | 2/1977 | McGee | |
| 4,350,485 A | 9/1982 | Larribe | |
| 6,083,436 A | 7/2000 | Thompson et al. | |
| 6,109,209 A * | 8/2000 | Rudolph et al. | 118/724 |
| 6,521,152 B1 | 2/2003 | Wood et al. | |
| 6,691,393 B2 | 2/2004 | James et al. | |
| 6,726,753 B2 | 4/2004 | Koucouthakis et al. | |
| 6,749,937 B2 | 6/2004 | Gray | |

FOREIGN PATENT DOCUMENTS

| | | |
|---|---|---|
| DE | 102 48 782 A1 | 4/2004 |
| JP | 07277845 | 10/1995 |
| JP | 10202623 | 8/1998 |
| JP | 10 180009 | 1/2000 |
| JP | 2000-005941 | 1/2000 |
| WO | WO-01/23167 A1 | 4/2001 |

* cited by examiner

*Primary Examiner* — Christina Johnson
*Assistant Examiner* — Xue Liu
(74) *Attorney, Agent, or Firm* — Shumaker & Sieffert, P.A.

(57) ABSTRACT

A method of manufacturing a carbon-carbon brake disc uses a restraint fixture (12) that includes a preform retention region configured to limit contracting forces applied against a preform (10) in the preform retention region when the restraint fixture (12) thermally contracts. In one embodiment, the restraint fixture (12) comprises a band (12) having a first surface defining the preform retention region and a first expansion portion (26, 28, 29) adapted to deform upon application of a force to the band (12).

19 Claims, 6 Drawing Sheets

METHOD OF MANUFACTURING A CARBON-CARBON BRAKE DISC

This application is a Divisional of co-pending application Ser. No. 10/942,258, filed on Sep. 16, 2004 now abandoned, the entire contents of which are hereby incorporated by reference and for which priority is claimed under 35 U.S.C. §120

FIELD OF THE INVENTION

The present invention is directed to a fixture for holding a preform during a heating process, and, more specifically, toward a restraint fixture for holding a preform that expands during a heating process and limits the force applied to the preform when the restraint fixture cools.

BACKGROUND OF THE INVENTION

Brake discs for aircraft or automobiles require materials having high heat resistance and long wear. Asbestos has been used in these applications, due to its heat resistance properties. Asbestos-based friction components have limited applicability under severe use conditions because the polymeric resins used to bind the asbestos fibers together decompose at elevated temperatures. The use of carbon-carbon brake components has therefore become more common.

Among the types of substrates used to make carbon-carbon parts are discontinuous carbon fiber moldings, nonwoven airlaid carbon substrates, woven carbon fiber substrates, and braided carbon fiber substrates. Carbon-carbon parts can also be made by using fibers that are precursors to carbon fibers to build a preform and then converting the fiber to carbon fiber. The substrates are typically stacked on top of each other to a desired thickness, and then the stacked substrates may be needle-punched together to join or consolidate the substrates to each other by intermingling fibers between the layers of substrates to form the preform. Other methods of manufacturing a preform or impregnating the preform with pitch may also be used.

An alternate method of consolidating the layers of a substrate is to use a pitch or resin binder and press the materials under heat and pressure to form a preform. The preform is then typically batch carbonized to reduce its non-carbon content. The carbonized preform may then be die cut or machined to a desired shape for further densification.

The preform may be further densified by a chemical vapor deposition (CVD) process, e.g. with hydrocarbon gasses, by resin infiltration or by pitch infiltration and then carbonized yet again. These densification processes may be repeated until the desired density is attained. The preform may then be heat-treated to reorient the carbon atoms, which modifies the thermo-mechanical properties of the preform, machined if necessary, and the non friction surfaces treated with an antioxidant to form the finished carbon-carbon part.

It has been found that, for preforms containing pitch, if the preform is carbonized without undergoing a stabilization step, a significant amount of the liquid pitch runs out of the preform during carbonization. This limits the density of the resulting carbon-carbon preform. In an effort to address this problem, the present inventors have attempted to carbonize performs while they are contained in a restraint fixture. The use of such a restraint fixture substantially addresses the problem of run out, but may cause damage to the finished perform. This is because, while the preform and the restraint fixture both expand when heated during the carbonization process, the restraint fixture contracts to a greater extent that the preform as it cools and thus squeezes and sometimes damages the preform. It would therefore be desirable to provide a restraint fixture for quickly and efficiently producing preforms that reduces the need for a stabilization step and avoids pitch run out during carbonization.

SUMMARY OF THE INVENTION

One aspect of the invention comprises a restraint fixture including a band having a central portion having first and second ends and a first finger extending from the first end at a first angle and a second finger extending from the second end at a second angle. The center portion is curved so that its first end lies adjacent to its second end, and the first finger is connected to the second finger.

Another aspect of the invention comprises a restraint fixture that includes a band having a central portion having first and second ends, a first finger extending from the first end and a second finger extending from the second end. The center portion is curved so that the first end lies adjacent to the second end and the first finger is connected to the second finger. The band has a first configuration wherein the first finger extends from the first end at a first angle and the second finger extends from the second end at a second angle, and a second configuration wherein the first finger extends from the first end at a third angle different than the first angle and the second finger extends from the second end at a fourth angle different from the second angle.

A further aspect of the invention comprises a restraint fixture that includes a band having a first surface defining a preform retention region and a first expansion portion adapted to deform upon application of a force to the band first surface.

Another aspect of the invention comprises a restraint fixture that includes a band having a first surface defining a preform retention region and an arrangement for limiting a force exerted by the band on a preform in the preform retention region during a thermal contraction of the band.

An additional aspect of the invention comprises a restraint fixture that includes a band having first edge and a second edge and an inner surface defining a preform retention region, wherein the band has an inner diameter at the first edge greater than the inner diameter at the second edge.

BRIEF DESCRIPTION OF THE DRAWINGS

These and other aspects and features of the present invention will be better understood after a reading of the following detailed description together with the drawings wherein.

DETAILED DESCRIPTION

Figure 1:
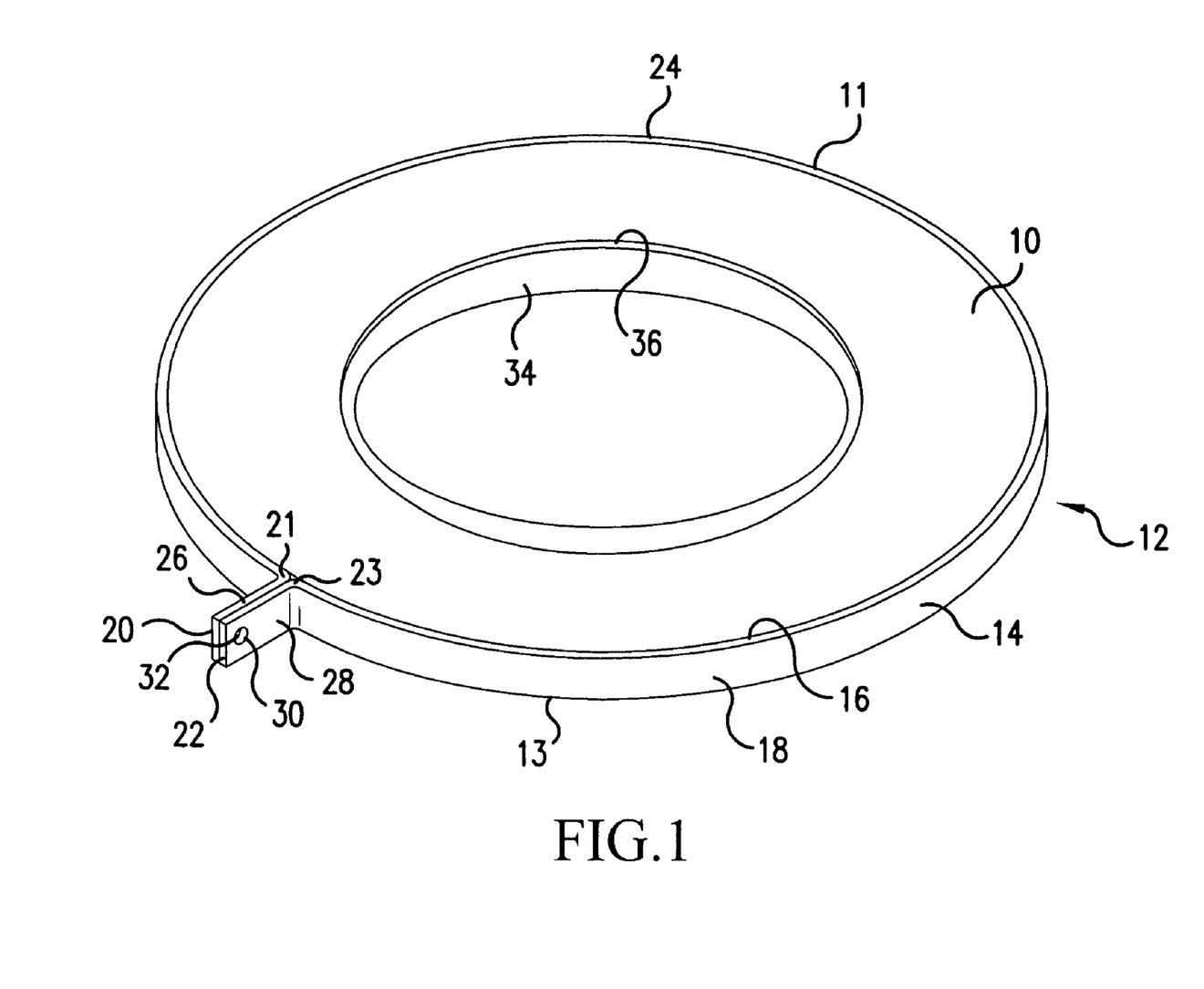
FIG. 1 is a perspective view of a restraint fixture according to an embodiment of the present invention holding a preform before a heating process has been carried out on the preform.

Referring now to the drawings, wherein the showings are for the purpose of illustrating preferred embodiments of the invention only and not for the purpose of limiting same, FIG. 1 shows a preform 10 surrounded by a generally circular restraint fixture 12 comprising a steel band 14 having an inner surface 16, an outer surface 18, a first end 20 and a second end 22. Band 14 includes a first or top edge 11 lying in a first plane and a second or bottom edge 13 spaced from the first edge and lying in a second plane generally parallel to the first plane. Restraint fixture 12 includes a generally circular central body portion 24 defining a closed circular region having a first end 21 and a second end 23, a first finger 26 formed by bending band 14 at central body first end 21 at an angle of about 90 degrees to the band body portion 24, and a second finger 28 formed by bending band 14 at central body portion second end 23 at about a 90 degree angle to band body 24. Central body portion 24 is curved so that central body portion first end 21 lies adjacent to or contacts central body portion second end 23 and so that the inner, planar surface 16 of first finger 26 is aligned with and may contact the inner planar surface 16 of second finger 28. These planar contact surfaces of first finger 26 and of second finger 28 may be referred to herein as "first and second planar contact surfaces." Each of first finger 26 and second finger 28 may include an opening 30 for receiving a fastener, such as, for example, a screw 32, for joining the first and second fingers 26, 28 together; however other ways of connecting the first and second fingers 26, 28 are envisioned. As explained below, it is preferable that opening 30 is formed near the first and second ends 18, 20 of band 14 leaving portions of the first and second fingers between openings 30 and preform 10 in contact with one another but unattached. An inner wall 34 may also be provided for engaging an inner surface 36 of preform 10 as illustrated in FIG. 1. Inner wall 34 is preferably used with all embodiments of the present invention; for clarity, it is only depicted in FIG. 1.

Figure 2:
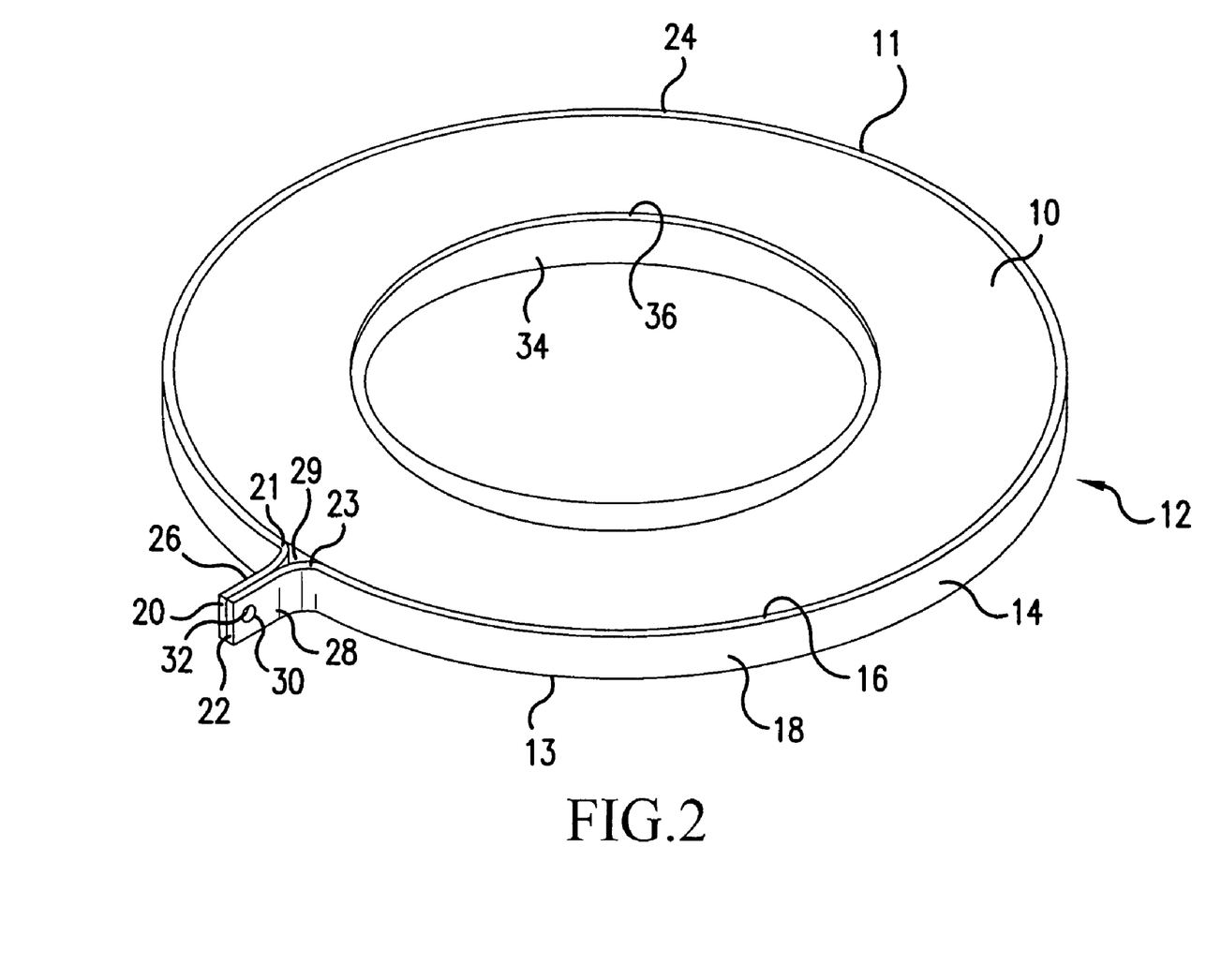
FIG. 2 is a perspective view of the restraint fixture and preform of FIG. 1 after a heating process has been carried out on the preform.

In use, restraint fixture 12 is placed around preform 10, and the first finger 26 and second finger 28 are fastened together with fastener 32. When a standard carbonization process is carried out on the restraint fixture 12 and preform 10, at a temperature of about 750° C., for example, both the preform 10 and the restraint fixture 12 thermally expand. However, once the preform is carbonized, the new coefficient of thermal expansion will not allow the preform to shrink back to its original size when it cools. The restraint fixture 12, however, will shrink as it cools, and as it shrinks, it applies force to the circumference of preform 10. This squeezing may damage the preform. However, as will be appreciated from FIG. 2, when the restraint fixture 12 of this embodiment of the present invention shrinks, fingers 26, 28 bend away from one another and form a gap 29 between central body portion first end 21 and central body portion second end 32. In this second configuration, the angle between each finger and the central body portion 24 increases, and the force applied against the preform 10 is thus limited. Fingers 26, 28 thereby form an expansion region that expands, or more precisely, limits the contraction of restraint fixture 12 as the restraint fixture 12 cools. Therefore, restraint fixture 12 is deformed as it contracts, does not contract to its original size, and limits the force applied against preform 10 during cooling.

Figure 5:
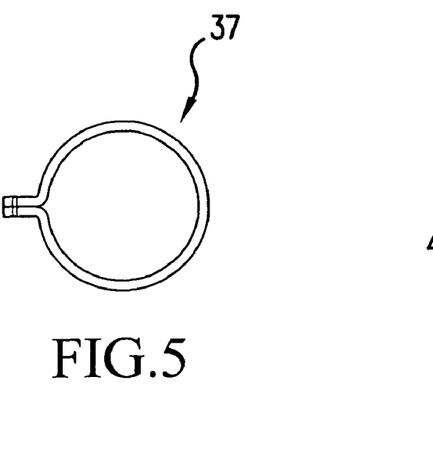
FIG. 5 is a top plan view of a carbon-carbon variation of the restraint fixture of FIG. 1.

Band 14 may be formed from a variety of thicknesses of steel. The present inventors have found that steel sheet as thin as 18 gauge or as thick as one half inch can be used to form band 14. When thinner material is used, the distance between opening 30 and preform 10, in other words, the length of first finger 26 and second finger 28, may be relatively small because band 14 and fingers 26, 28 will readily deform. When a thicker band 14 is used, such as one formed from quarter inch steel, the fingers 26, 28 must be longer so that the pressure of band 14 contracting around preform 10 during cooling will be sufficient to deform the first and second fingers 26, 28 without damaging the preform 10. Beneficially, while thinner bands generally can only be used once, thicker bands are reusable and may be used, for example, up to about 100 times before the repeated heating and cooling cycles render them unsuitable for further use. Alternately, band 14 can be formed from a carbon-carbon material that is both strong and will withstand a greater number of heating and cooling cycles before failing. A carbon-carbon band 37 is illustrated FIG. 5. A benefit of carbon-carbon band 37 is that carbon-carbon can be used at temperatures higher than those at which metals can be used.

Figure 3:
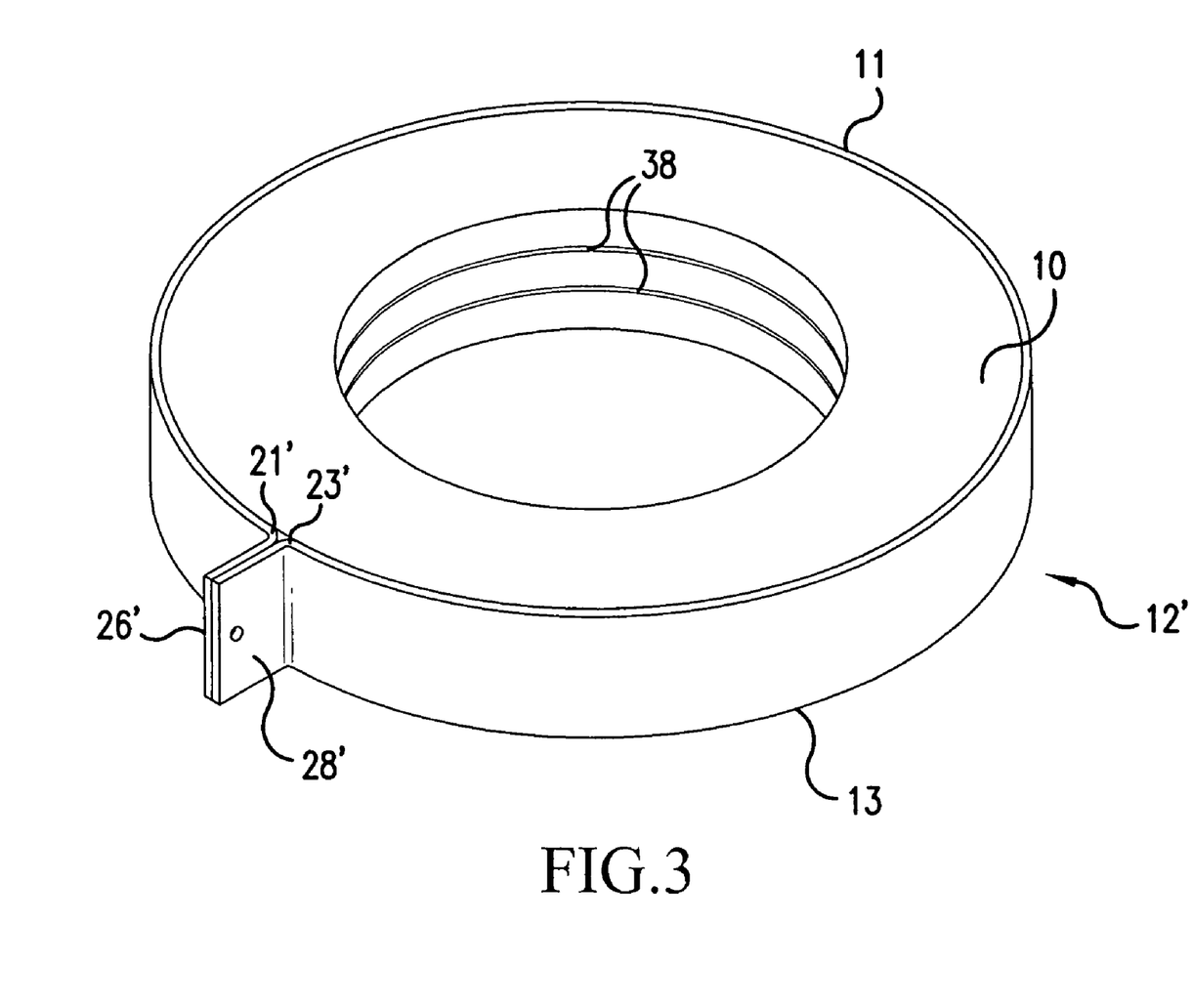
FIG. 3 is a perspective view of a variation of the restraint fixture of FIG. 1 holding a plurality of preforms separated by separation plates.
Figure 4:
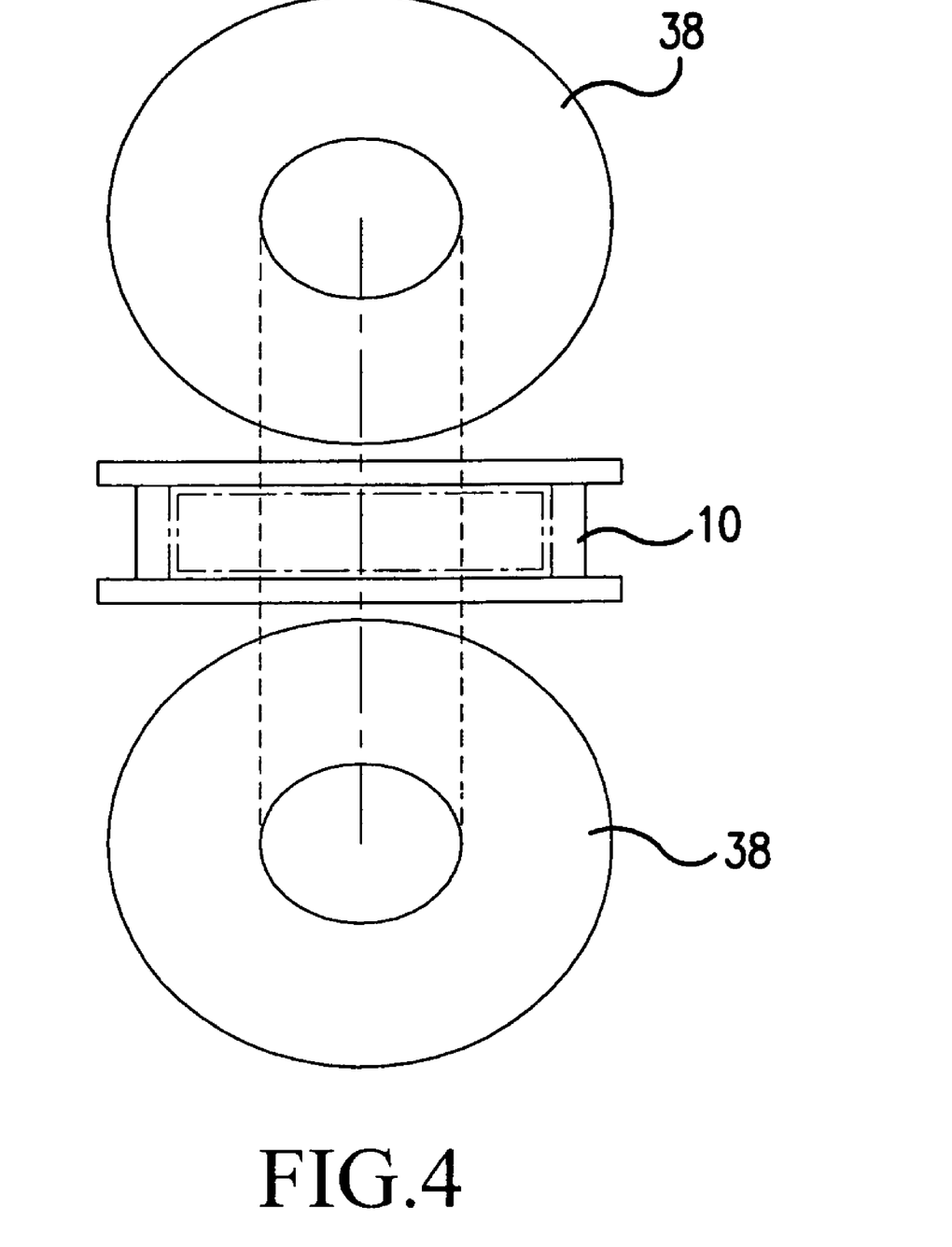
FIG. 4 illustrates the arrangement of the preforms and separation plates of FIG. 3.

As illustrated in FIGS. 3 and 4, a taller fixture 12' can also be used to hold multiple preforms 10 stacked vertically with steel separation plates 38 therebetween. The plates 38 separating the preforms may have inner diameters smaller than the inner diameters of the preforms and outer diameters larger than the outer diameters of the preforms as illustrated in FIG. 4.

Figure 6:
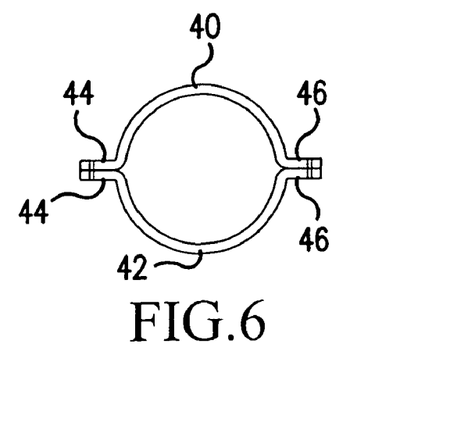
FIG. 6 is a top plan view of a restraint fixture according to a second embodiment of the invention.

A second embodiment of the present invention is illustrated in FIG. 6 wherein a restraint fixture formed from first and second generally U-shaped steel members 40, 42 is illustrated. First and second steel members 40, 42 are joined together at first and second fingers 44, 46 at their terminal ends. This embodiment provides benefits similar to those provided by the first embodiment, but allows for the material of the first and second steel members 40, 42 to deform at two locations, between each pair of fingers 44, 46, to limit stress on preform 10 during thermal contraction.

Figure 7:
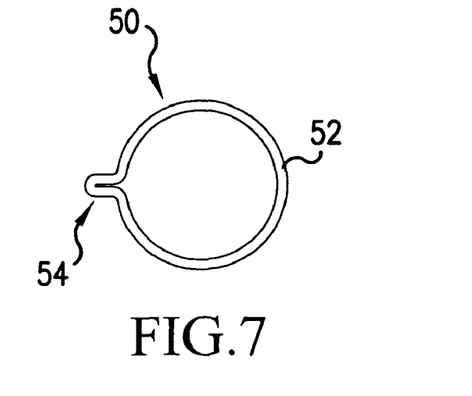
FIG. 7 is a top plan view of a restraint fixture according to a third embodiment of the invention.

A third embodiment of the invention is illustrated in FIG. 7 wherein a restraint fixture 50 is formed from a continuous band of material 52 having a crimped portion 54 that is formed either when the band 52 is made or at the time the band 52 is placed around preform 10. Crimped portion 54 deforms or opens when restraint fixture 50 cools to limit the stress on preform 10. A band 50 having multiple crimped portions 54 could also be used.

Figure 8:
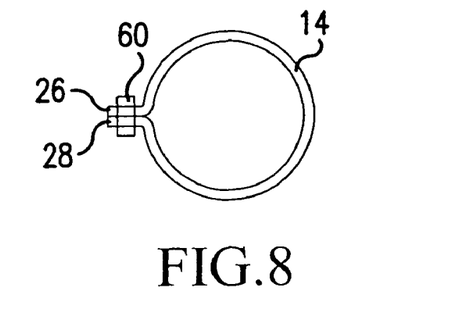
FIG. 8 is a top plan view of a restraint fixture according to a fourth embodiment of the invention.

A fourth embodiment of the invention is illustrated in FIG. 8 wherein band 14 is shown with first finger 26 and second finger 28 secured with a clip or loop or band member 60 that will stretch or break when the contraction of the band 14 around the preform 10 begins to pull first finger 26 away from second finger 28 as the band cools. The band member 60 is weaker than the first and second fingers and thus breaks or deforms before the first and second fingers 26, 28 bend. Band member 60 may be made from a material that is relatively thin and weak which fails under a given amount of stress or may be relatively strong but which weakens when exposed to the heat of the carbonization process to help ensure that band 60 only breaks once the restraint fixture 12 has served its purpose.

Figure 9:
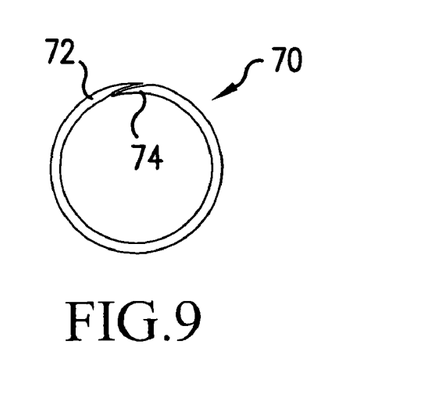
FIG. 9 is a top plan view of a restraint fixture according to a fifth embodiment of the invention.

A fifth embodiment of the invention is illustrated in FIG. 9 wherein a restraint fixture 70 is shown having first and second unconnected ends 72, 74 which overlay one another in a sliding fashion so that an inner surface of first end 72 overlies an outer surface of second end 74. Band 74 is made from spring steel or other resilient material that so that first end 72 slides over second end 74 as preform 10 expands during heating and maintains a relatively constant force on the outside diameter of the preform. When the preform and restraint fixture cool, a relatively constant force is maintained on the exterior of the preform, but the restraint fixture does not contract to its original configuration and thus does not damage the preform.

Figure 10:
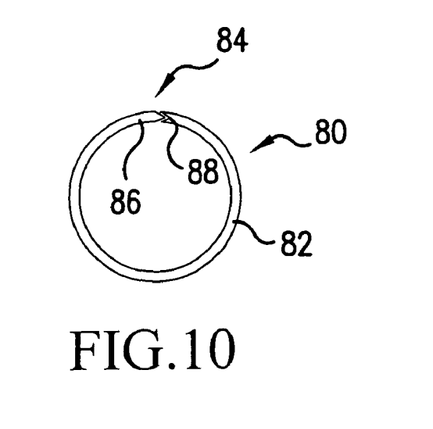
FIG. 10 is a top plan view of a restraint fixture according to a sixth embodiment of the invention.

A sixth embodiment of the invention is illustrated in FIG. 10 wherein a restraint fixture 80 comprising a steel band 82 with a cut 84 is disclosed. A projection 86 is provided at one end of band 82 which is received in a recess 88 at the other end of the band. The shapes of the projection 86 and the recess 88 should be complimentary, but may differ from those shown in FIG. 10. Cut 84 allows band 82 to open as the band cools and contracts to limit the forces applied against the preform, while projection 86 and recess 88 limit pitch run out before the pitch cures.

Figure 11:
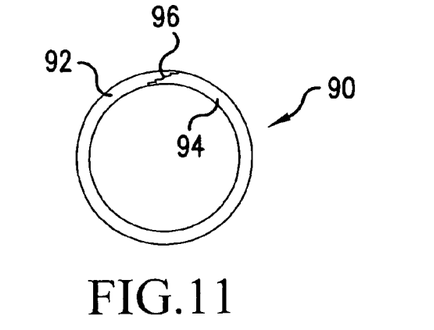
FIG. 11 is a top plan view of a restraint fixture according to a seventh embodiment of the invention.
Figure 12:
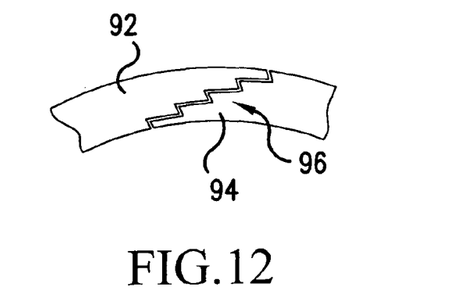
FIG. 12 is a detail view of region XII of FIG. 11.

A seventh embodiment of the invention is illustrated in FIGS. 11 and 12 wherein a restraint fixture 90 is shown that is similar to the restraint fixture of the fifth embodiment of FIG. 9, but wherein each of the first and second overlapping ends 92, 94 includes ratchet teeth 96 (shown in detail in FIG. 12). The overlapping ends 92, 94 move little if at all relative to one another as the restraint fixture 90 expands. However, as the restraint fixture 90 cools and begins to shrink around a more-slowly shrinking preform, the ratchet teeth 96 allow the overlapping ends 92, 94 to slide relative to each other in one direction and prevent the interior of the restraint fixture from becoming too small.

Figure 13:
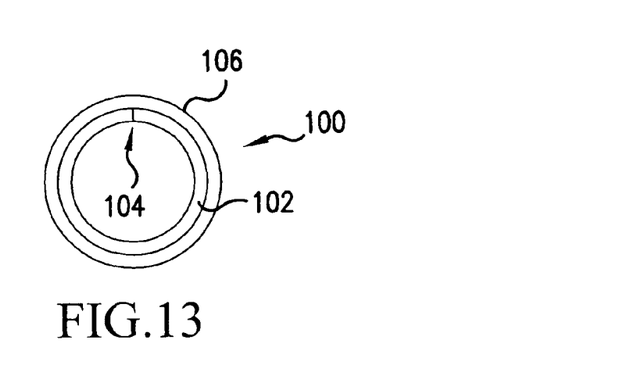
FIG. 13 is a top plan view of a restraint fixture according to an eighth embodiment of the invention.

An eighth embodiment of the invention is illustrated in FIG. 13 wherein a restraint fixture 100 comprising a carbon-carbon band 102 having a cut 104 is shown encircling a preform 10. A band of carbon-carbon fibers 106 is used to secure band 102 about preform 10 which fibers 106 may break as the restraint fixture expands or which may have a negative coefficient of thermal expansion and thus expand as the restraint fixture cools, reducing the amount of force applied against the preform.

Figure 14:
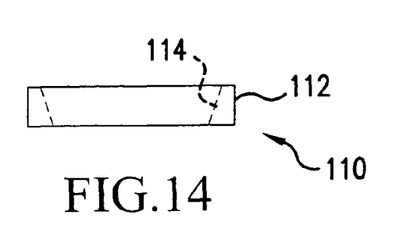
FIG. 14 is a side elevational view of a restraint fixture according to a ninth embodiment of the invention.
Figure 15:
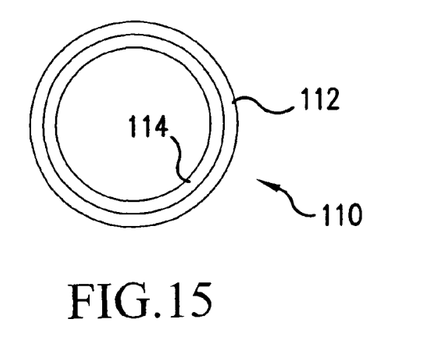
FIG. 15 is a top plan view of the restraint fixture of FIG. 14.

A ninth embodiment of the invention is illustrated in FIGS. 14 and 15 wherein a restraint fixture 110 is illustrated comprising an uninterrupted band 112 having a sloped inner wall 114. In this embodiment, the band contracts as it cools, but sloped inner wall 114 causes cured preform 10 to slide axially (upwardly in FIG. 14) and out of restraint fixture 110 as band 112 cools to minimize damage to the preform 10.

The invention has been described in terms of several embodiments, however, other modifications and additions will become apparent to those skilled in the art upon a reading of this disclosure and such modifications and additions are intended to be included within the scope of this patent.

We claim:

1. A method of manufacturing a carbon-carbon brake disc, the method comprising:
   placing a brake disc preform in a restraint fixture, wherein the restraint fixture includes:
   a band comprising first and second spaced edges, wherein the band defines a width between the first and second spaced edges and a substantially constant thickness, wherein the band comprises a central portion that defines a closed circular region, wherein the central portion comprises a first end and a second end in contact with the first end, wherein the first edge between the first and second ends lies entirely in a first plane, wherein the band comprises a first finger extending from the first end at a first angle and having a first planar contact surface, wherein the band comprises a second finger extending from the second end at a second angle and having a second planar contact surface in contact with the first planar contact surface, and
   a connector connecting the first finger to the second finger;
   carbonizing the preform within the restraint fixture at a temperature that causes both the preform and the restraint fixture to expand;
   cooling the carbonized preform within the restraint fixture, wherein the first finger and the second finger of the restraint fixture form an expansion region during cooling that limits contraction of the restraint fixture during cooling to limit a force applied b the restraint fixture to the carbonized preform during cooling.

2. The method of claim 1, wherein the first angle is approximately 90 degrees and the first angle is approximately equal to the second angle.

3. The method of claim 1, wherein the connector has a given orientation and position with respect to the first finger and the second finger and holds the first finger in contact with the second finger, wherein the band has a first configuration when the connector is in the given orientation and position, with the first finger extending from the first end at a first angle and the second finger extending from the second end at a second angle, wherein in the first configuration, the first finger contacts the second finger over a first contact area and the central portion first end contacts the central portion second end, wherein the band has a second configuration when the connector is in the given orientation and position, with the first finger extending from the first end at a third angle different than the first angle and the second finger extending from the second end at a fourth angle different from the second angle, and wherein in the second configuration the first finger contacts the second finger over a second contact area less than the first contact area and the central portion first end is spaced from the central portion second end.

4. The method of claim 3, wherein the first finger comprises a first finger end spaced from the central portion first end and the connector connects the first finger to the second finger at a point closer to the first linger end than to the central portion first end.

5. The method of claim 3, wherein the second edge between the first end and the second end lies entirely in a second plane substantially parallel to the first plane.

6. The method of claim 1, wherein the connector secures the first finger to the second finger at a point spaced from the closed circular region by a first expansion portion, and wherein, during cooling, the first expansion portion deforms upon application of a force from the carbonized preform to an inner surface of the band to open a gap in the closed circular region.

7. The method of claim 6, further comprises placing the brake disc perform about a wall having a surface defining a preform retention region in combination with the band, wherein the surface of the wall engages inner peripheral surface of the brake disc preform.

8. The method of claim 7, wherein the wall is ring shaped.

9. The method of claim 8, wherein the band surrounds the surface of the wall.

10. The method of claim 7, wherein the brake disc perform comprises a first brake disc perform, wherein placing the brake disc preform in the restraint fixture comprises placing a separator plate in the preform retention region, wherein the separator plate is adapted to separate the first brake disc preform in the preform retention region from a second brake disc preform in the preform retention region, wherein the inner surface of the band defines a preform outer diameter, wherein the surface of the wall defines a preform inner diameter, and wherein the separation plate comprises a larger outer diameter than the preform outer diameter and a smaller inner diameter than the preform inner diameter.

11. The method of claim 1, wherein the first finger comprises a first end spaced from the central portion first end and the second finger comprises a second end spaced from the central portion second end, and wherein the connector connects the first finger to the second finger at a point closer to the first finger first end than to the central portion first end.

12. The method of claim 1, wherein the first finger comprises a first end spaced from the central portion first end and the second finger comprises a second end spaced from the central portion second end, and wherein the connector connects the first finger to the second finger at a point sufficiently far from the central portion first end that the first and second fingers will deform upon the application of outward pressure against the circular central portion.

13. The method of claim 11, wherein the first end of the finger comprises an end of the band.

14. The method of claim 4, wherein the first finger end comprises an end of the band.

15. The method of claim 1, wherein the first finger comprises a first finger end spaced from the central portion first end and defines a first opening disposed closer to the first finger end than to the central portion first end, wherein the second finger comprises a second finger end spaced from the central portion second end and defines a second opening disposed closer to the second finger end than to the central portion second end, and wherein the connector extends through the first opening and the second opening and connects the first finger to the second finger.

16. The method of claim 15, wherein the first finger first end comprises an end of the band.

17. The method of claim 1, wherein the second edge between the first end and the second end lies in a second plane parallel to the first plane.

18. The method of claim 7, wherein the brake disc preform comprises an outer peripheral surface, and wherein the outer peripheral surface faces the inner surface of the band when the brake disc preform is disposed in the preform retention region.

19. A method comprising:
placing a brake disc preform within a preform retention region, wherein the brake disc preform defines a first size, an inner surface, and an outer surface, and wherein the preform retention region is defined by:
a wall that defines an outer surface, wherein the outer surface of the wall engages the inner surface of the brake disc preform; and
a restraint fixture that comprises:
a band comprising a central portion that defines a substantially closed circular region, wherein the central portion comprises a first end and a second end in contact with the first end, wherein the band comprises a first finger extending from the first end at a first angle and having a first planar contact surface, wherein the band comprises a second finger extending from said second end at a second angle and having a second planar contact surface in contact with the first planar contact surface, and
a connector connecting the first finger and the second finger, wherein the brake disc preform is placed within the substantially closed circular region;
heating the brake disc preform and the restraint fixture, wherein the brake disc preform and the restraint fixture mechanically expand during the heating;
carbonizing the brake disc perform to form a carbonized brake disc; and
cooling the carbonized brake disc and the restraint fixture, wherein the carbonized brake disc contracts to a second size during the cooling, wherein the second size is greater than the first size, wherein the restraint fixture contracts during the cooling and applies a force to a circumference of the brake disc preform, and wherein the first finger and the second finger form an expansion region that deforms during the cooling to limit the force applied by the restraint fixture to the circumference of the brake disc preform.

* * * * *

UNITED STATES PATENT AND TRADEMARK OFFICE
CERTIFICATE OF CORRECTION

PATENT NO. : 8,105,511 B2  
APPLICATION NO. : 12/213235  
DATED : January 31, 2012  
INVENTOR(S) : Allen H. Simpson et al.

It is certified that error appears in the above-identified patent and that said Letters Patent is hereby corrected as shown below:

Col. 6, Line 19 (Claim 1), "applied b" should be -- applied by --

Signed and Sealed this
Nineteenth Day of February, 2013

Teresa Stanek Rea
*Acting Director of the United States Patent and Trademark Office*